United States Patent
Chu et al.

(10) Patent No.: US 11,726,600 B1
(45) Date of Patent: Aug. 15, 2023

(54) FULL-AREA TOUCH DEVICE

(71) Applicant: SUNREX TECHNOLOGY CORP., Taichung (TW)

(72) Inventors: Yin Chu, Taichung (TW); Chih-Po Ku, Taichung (TW)

(73) Assignee: Sunrex Technology Corp., Taichung (TW)

(*) Notice: Subject to any disclaimer, the term of this patent is extended or adjusted under 35 U.S.C. 154(b) by 0 days.

(21) Appl. No.: 17/976,273

(22) Filed: Oct. 28, 2022

(30) Foreign Application Priority Data

Aug. 19, 2022 (TW) .................................. 111209049

(51) Int. Cl.
*G06F 3/041* (2006.01)
(52) U.S. Cl.
CPC .................................. *G06F 3/0416* (2013.01)
(58) Field of Classification Search
None
See application file for complete search history.

(56) References Cited

U.S. PATENT DOCUMENTS

2021/0278931 A1* 9/2021 Kim .................. G06F 3/0443

FOREIGN PATENT DOCUMENTS

| CN | 113031792 | 6/2021 |
| CN | 113867552 | 12/2021 |
| CN | 114385017 | 4/2022 |

* cited by examiner

*Primary Examiner* — Stephen T. Reed
(74) *Attorney, Agent, or Firm* — Burris Law, PLLC

(57) ABSTRACT

A full-area touch device including a supporting unit, a touch control unit and a plurality of limiting units. The supporting unit includes a base plate. The touch control unit is movable relative to the supporting unit between an unpressed original position and a pressed position. The limiting units are for limiting height position and travel distance of the touch control unit. Each of the limiting units includes a blocking portion disposed on the base plate, and a limiting portion disposed on a corresponding one of two support resilient sheet sets of the supporting unit. The limiting portions of the limiting units extend in a first axial direction or a second axial direction to be limited by the blocking portions of the limiting units.

9 Claims, 20 Drawing Sheets

US 11,726,600 B1

FULL-AREA TOUCH DEVICE

CROSS-REFERENCE TO RELATED APPLICATION

This application claims priority of Taiwanese Utility Model Application No. 111209049, filed on Aug. 19, 2022.

FIELD

The present disclosure relates to a field of computer technology, and more particularly to a full-area touch device applied to a notebook computer.

BACKGROUND

A touch pad is a plate placed in front of a notebook computer keyboard, allowing the user to move the cursor moving with the fingers on the plate. Typically, computer touch pads are presented in a half-area touch manner, in which there are defects as follows:

(1) The upper half region of the touch pad is a fixed structure that cannot be pressed, and a user can only press the lower half region of the touch pad, and the consumer will be inconvenienced and have a bad experience during use.

(2) The touch pad implementing the half-area touch manner has a complicated structure with numerous components, so that the touch pad is relatively thicker, and does not meet the requirements of the current light and thin notebook computer;

(3) The assembly process of the touch pad implementing the half-area touch manner is complicated, and has high defective rate and high production cost, so the touch pad has no competitive advantage on the market.

In addition, patent cases like CN113031792A, CN113867552A, CN114385017A, etc. do not teach a limiting structure design.

SUMMARY

The object of the disclosure is to provide a full-area touch device that can alleviate at least one of the drawbacks of the prior art.

According to the disclosure, the full-area touch device including a supporting unit, a touch control unit and a plurality of limiting units. The supporting unit includes a base plate, and a plurality of support resilient sheet sets connected to the base plate. The base plate has two first side edges that extend in a first axial direction, and two second side edges that extend in a second axial direction perpendicular to the first axial direction. The touch control unit is disposed on the support resilient sheet sets, and is drivable to move the support resilient sheet sets relative to the base plate in a third axial direction perpendicular to the first axial direction and the second axial direction. The touch control unit is movable relative to the supporting unit between an unpressed original position and a pressed position. The limiting units are disposed between the base plate and the support resilient sheet sets for limiting height position and travel distance of the touch control unit. Each of the limiting units includes a blocking portion that is disposed on the base plate, and a limiting portion that is disposed on a corresponding one of the support resilient sheet sets. The limiting portions of the limiting units extend in one of the first and second axial directions to be limited by the blocking portions of the limiting units.

BRIEF DESCRIPTION OF THE DRAWINGS

Other features and effects related to the present disclosure will be clearly presented in the embodying manner with reference to the drawings, in which.

DETAILED DESCRIPTION

Figure 1:
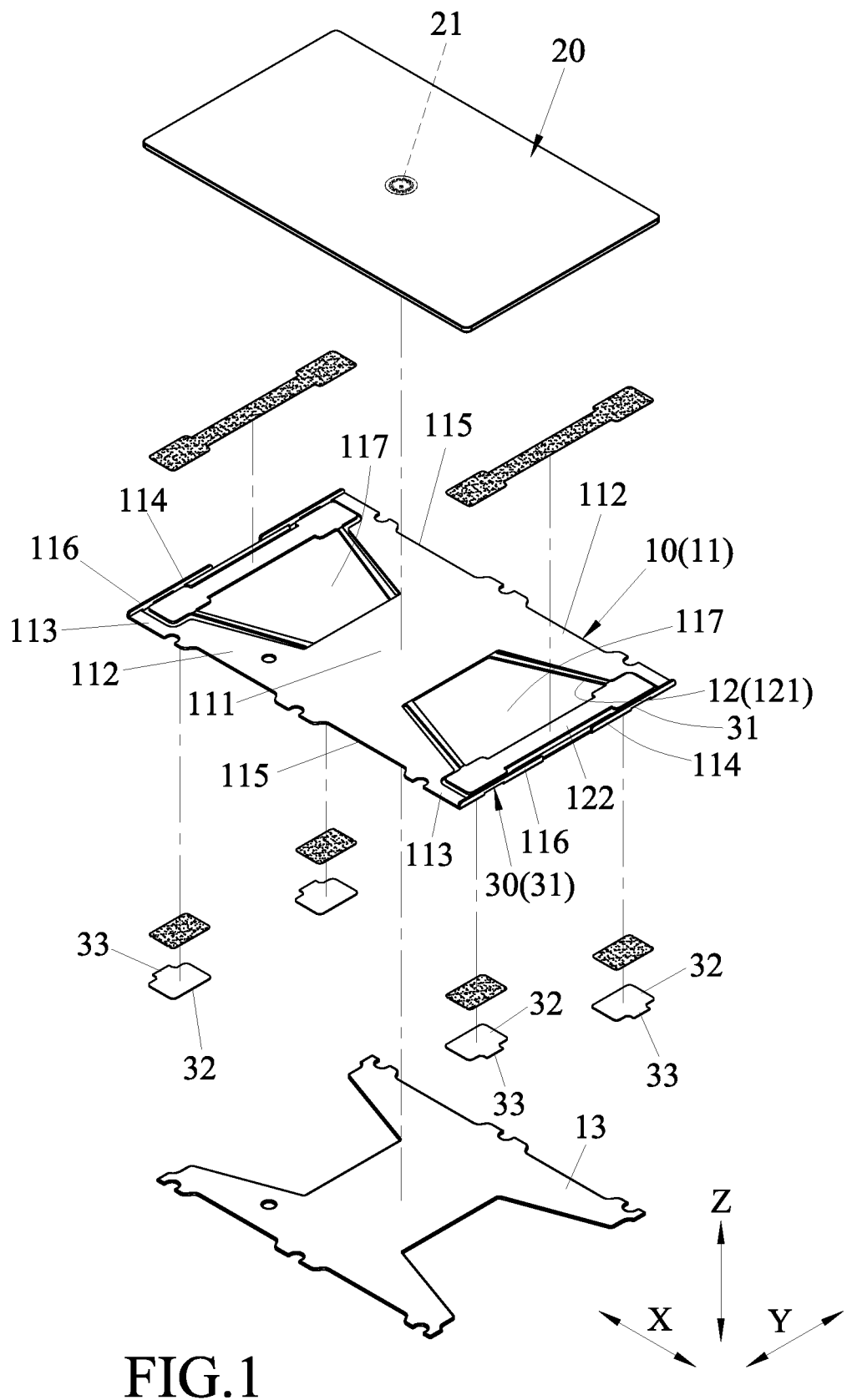
FIG. 1 is an exploded perspective view of a first embodiment of the full-area touch device according to the present disclosure.

Before the present disclosure is described in greater detail in connection with the preferred embodiments, it should be noted that similar elements are denoted by the same reference numerals in the following description.

Referring to FIGS. 1 to 5, a first embodiment of the full-area touch device according to the present disclosure includes a supporting unit 10, a touch control unit 20 and a plurality of limiting units 30.

The supporting unit 10 includes a base plate 11, two support resilient sheet sets 12 spaced apart from each other in a first axial direction (X) and connected to the base plate 11, and a reinforcing plate 13 adhered to a bottom portion of the base plate 11. The base plate 11 is H-shaped, and includes an intermediate portion 111, two side frame portions 112 spaced apart from each other in a second axial direction (Y) perpendicular to the first axial direction (X)

and respectively connected to two opposite sides of the intermediate portion 111 in the second axial direction (Y), four extension rods 113 extending in the first axial direction (X) and respectively connected to opposite ends of the side frame portions 112 in the first axial direction (X), two cross rods 114 extending in the second axial direction (Y) and each being connected between two of the extension rods 113, two first side edges 115 extending in the first axial direction (X), and two second side edges 116 extending in the second axial direction (Y). Two of the extension rods 113 are respectively connected to the opposite ends of one of the side frame portions 112, and the other two of the extension rods 113 are respectively connected to the opposite ends of the other one of the side frame portions 112. Each of the cross rods 114 is connected between two of the extension rods 113 that are located at the same side of the base plate 11 in the first axial direction (X). The intermediate portion 111 and the side frame portions 112, the extension rods 113, and the cross rods 114 cooperatively defining two hollow portions 117 spaced apart from each other in the first axial direction (X). Each of the first side edges 115 is defined by a respectively one of the side frame portions 112 and the two extension rods 113 connected thereto, and the second side edges 116 are respectively defined by the cross rods 114.

The support resilient sheet sets 12 are respectively disposed in the hollow portions 117 and are able to be bent in the third axial direction (Z). Each support resilient sheet set 12 includes two resilient strips 121 connected to the intermediate portion 111 and located between the side frame portions 112, and a floating plate 122 connected between the resilient strips 121. The floating plates 122 of the support resilient sheet sets 12 are located between the cross rods 114.

The reinforcing plate 13 is used for reinforcing the structural strength of the base plate 11.

The touch control unit 20 is disposed on the support resilient sheet sets 12, is adhered to the floating plates 122, and is drivable to move the support resilient sheet sets 12 in the third axial direction (Z) relative to the base plate 11. The touch control unit 20 has a tact switch 21, and is movable relative to the supporting unit 10 between an unpressed original position (see FIG. 5) and a pressed position (not shown) at which the tact switch 21 is triggered.

The limiting units 30 are disposed on the base plate 11 and the support resilient sheet sets 12, and are used for limiting the height position and travel distance of the touch control unit 20. Each limiting unit 30 includes a blocking portion 31 disposed on the base plate 11, a plate-shaped positioning portion 32 fixed to a bottom end of one of the floating plates 122, and a limiting portion 33 integrally connected to the positioning portion 32. In this embodiment, the blocking portion 31 of each limiting unit 30 is disposed on a bottom portion of a corresponding cross rod 114. Each limiting portion 33 protrudes outwardly from the corresponding positioning portion 32 (and the corresponding support resilient sheet set 12) in the first axial direction (X), and is limited by the corresponding blocking portion 31.

To provide further understanding of the functions, technical means and the expected effects of cooperation of various components of the present disclosure, the following description is believed to provide deeper and more specific understanding of the disclosure.

Figure 2:
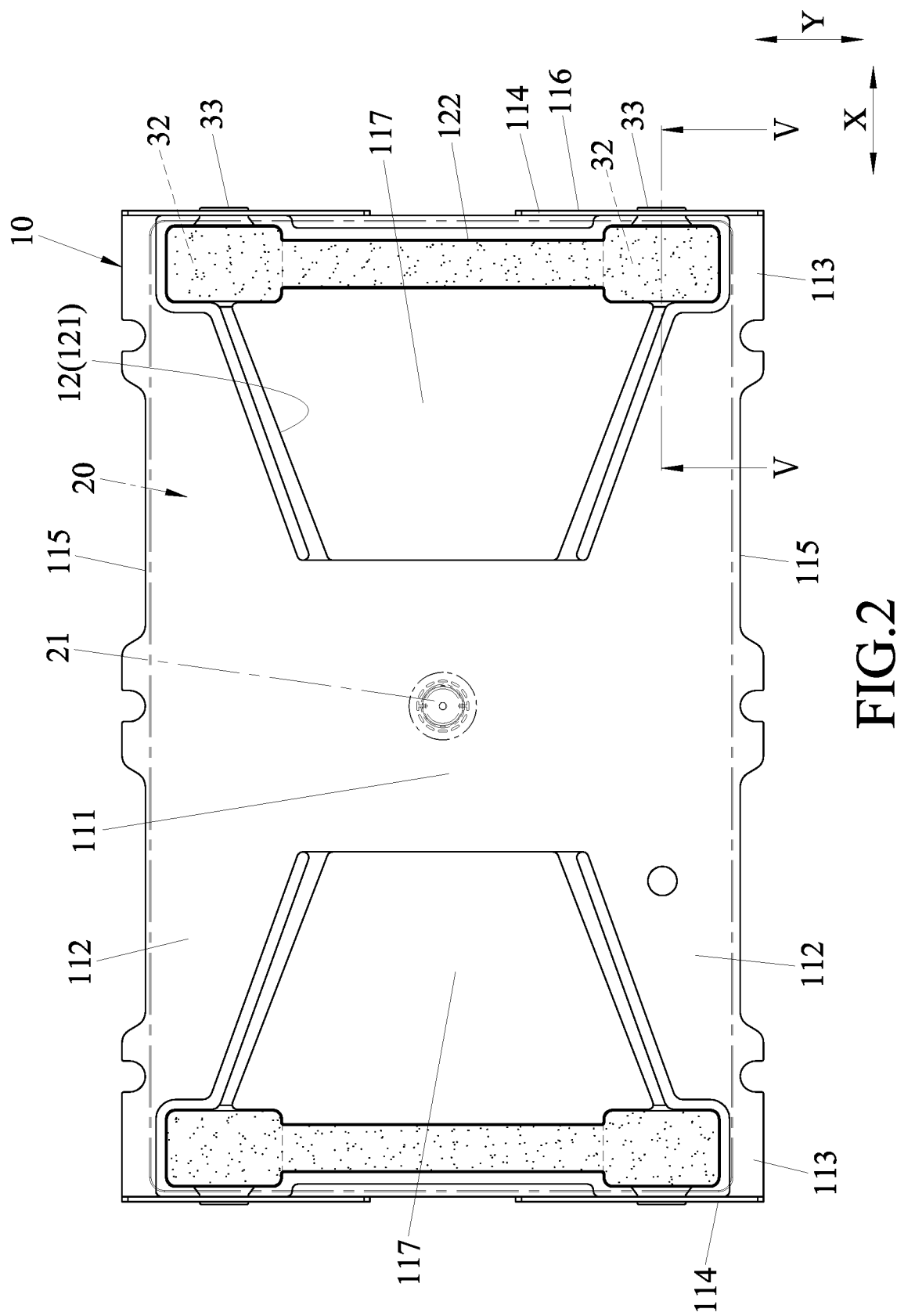
FIG. 2 is a schematic top view of the first embodiment.
Figure 3:
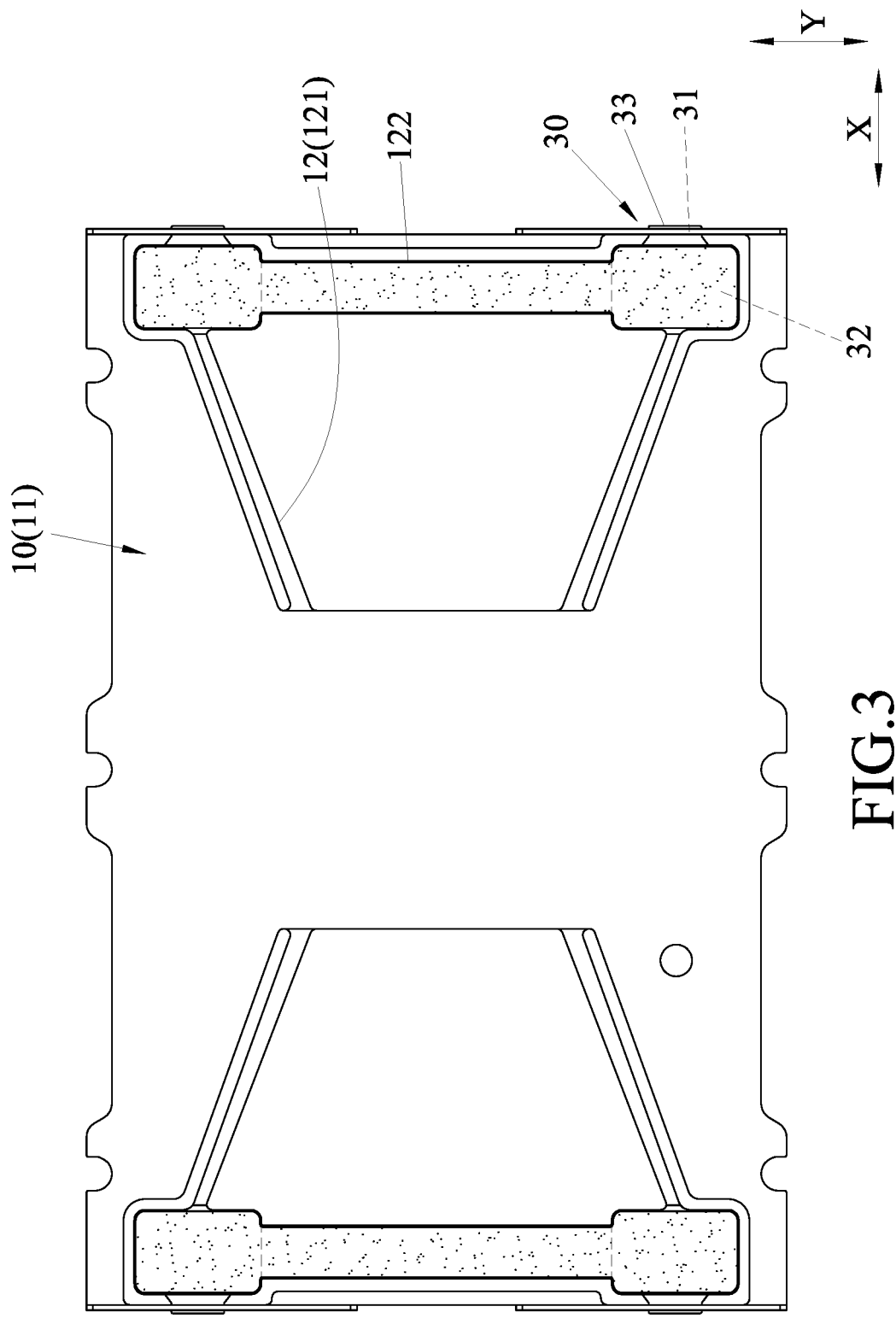
FIG. 3 is a top view illustrating a supporting unit of the first embodiment.
Figure 4:
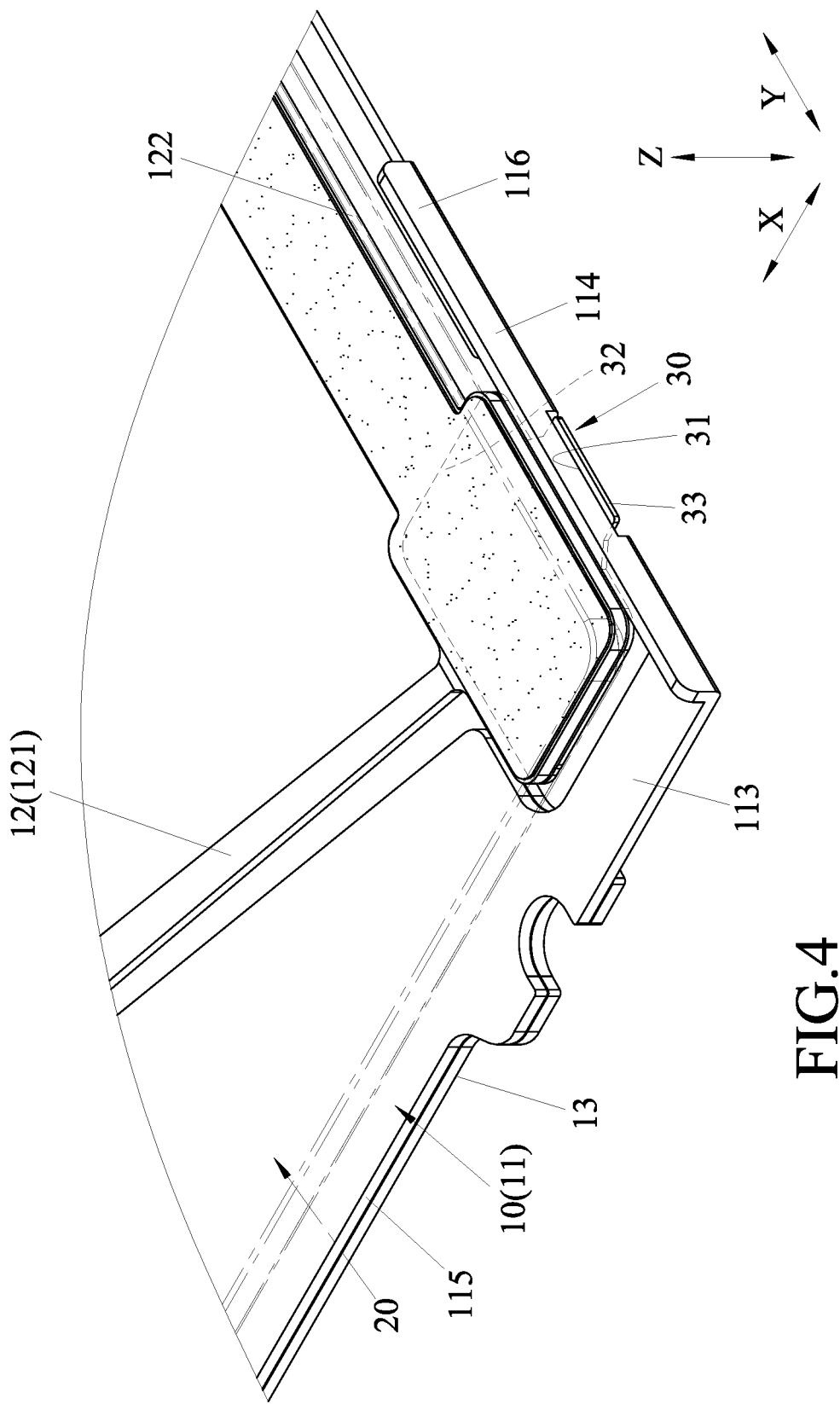
FIG. 4 is an enlarged fragmentary perspective view of the supporting unit and a limiting unit of the first embodiment.
Figure 5:
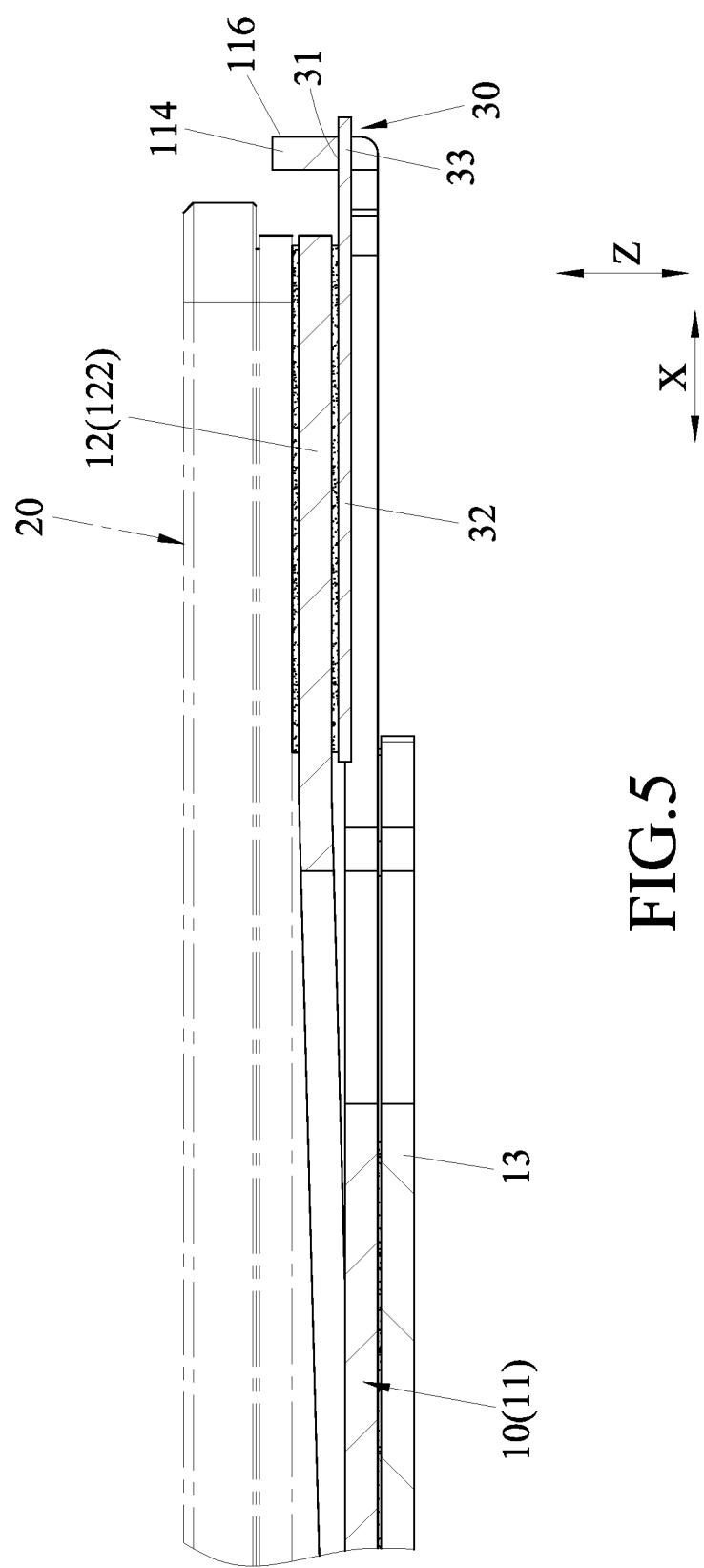
FIG. 5 is a fragmentary sectional view taken along line V-V in FIG. 2.
Figure 6:
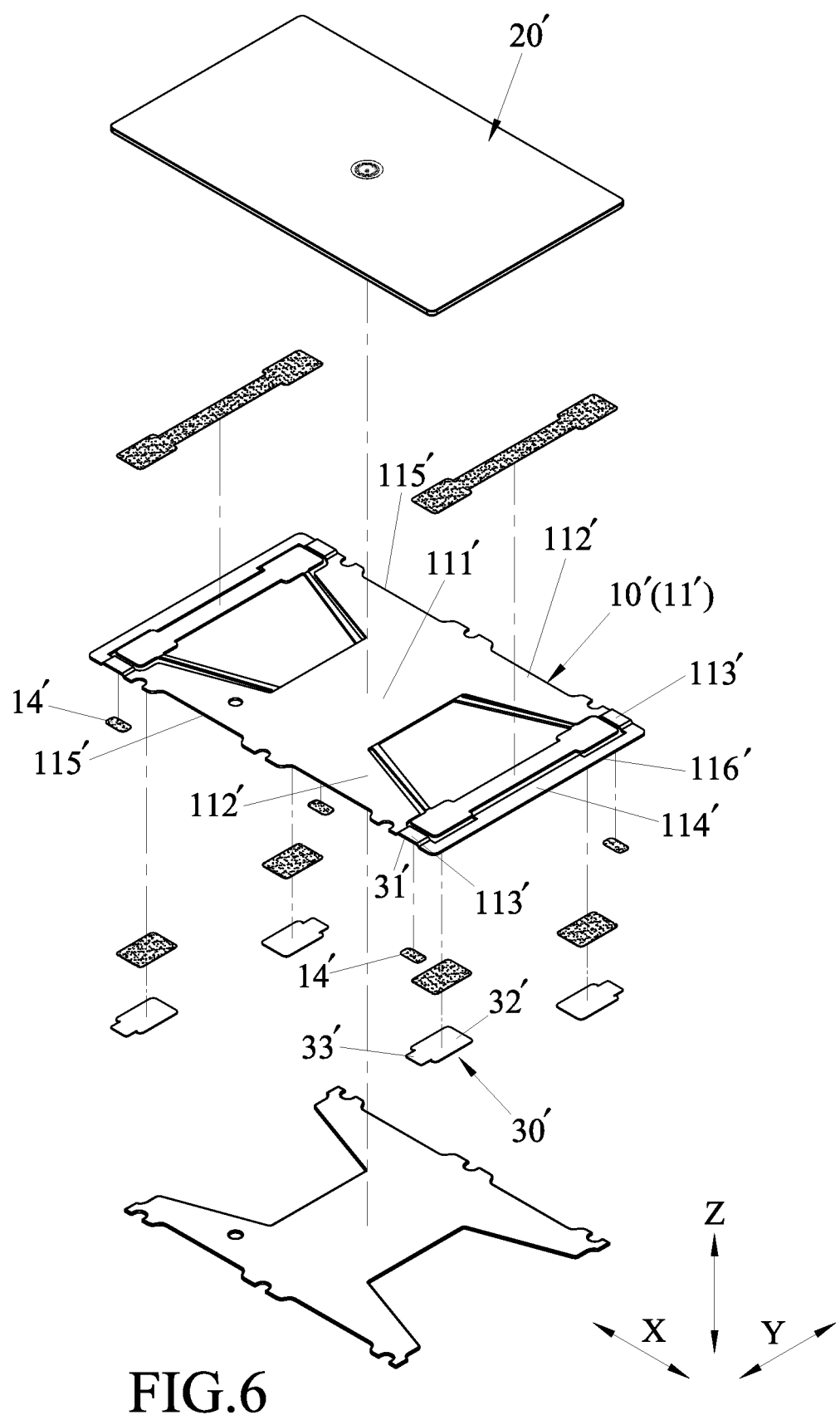
FIG. 6 is an exploded perspective view of a second embodiment of the full-area touch device according to the present disclosure.
Figure 7:
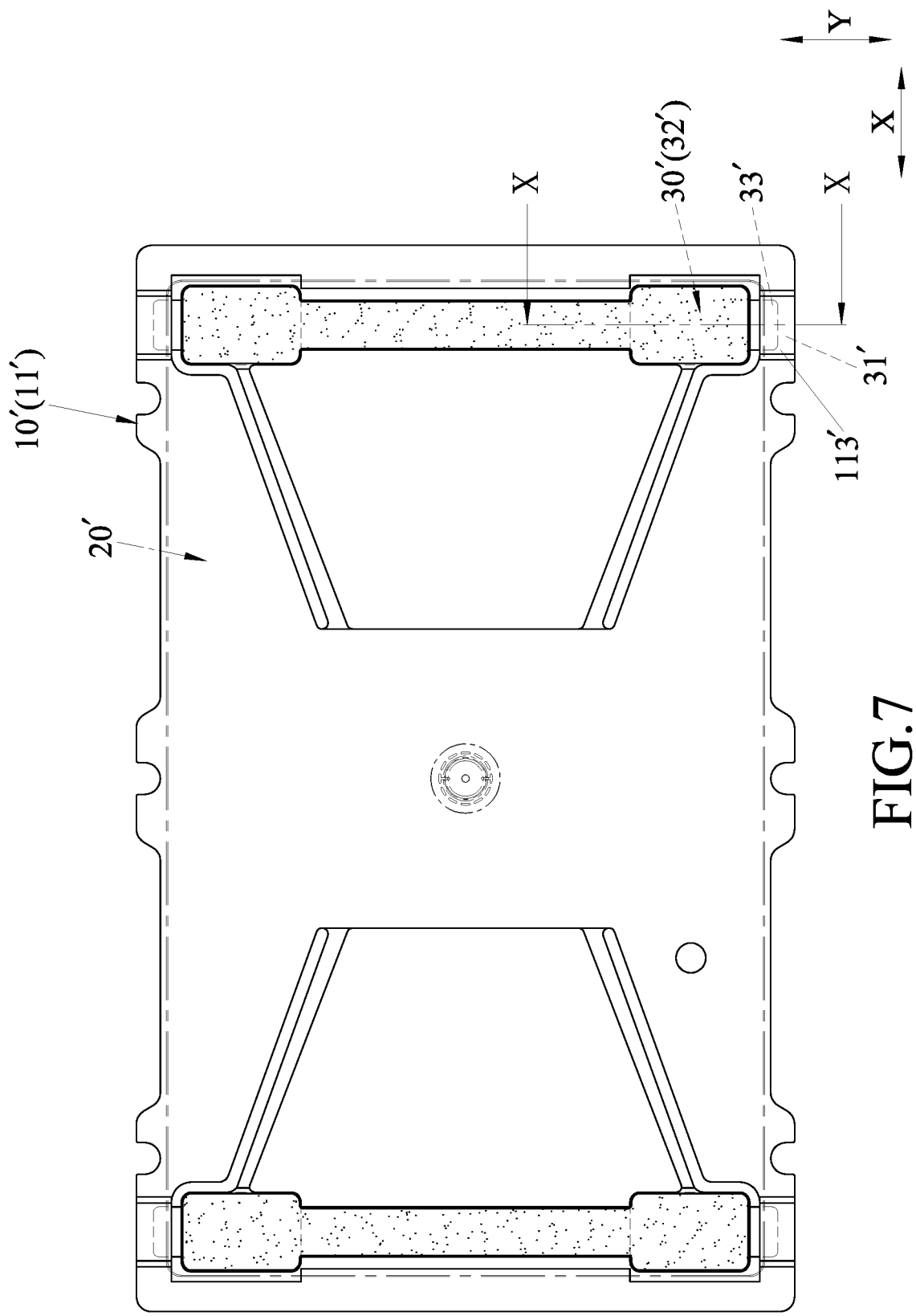
FIG. 7 is a schematic top view of the second embodiment.
Figure 8:
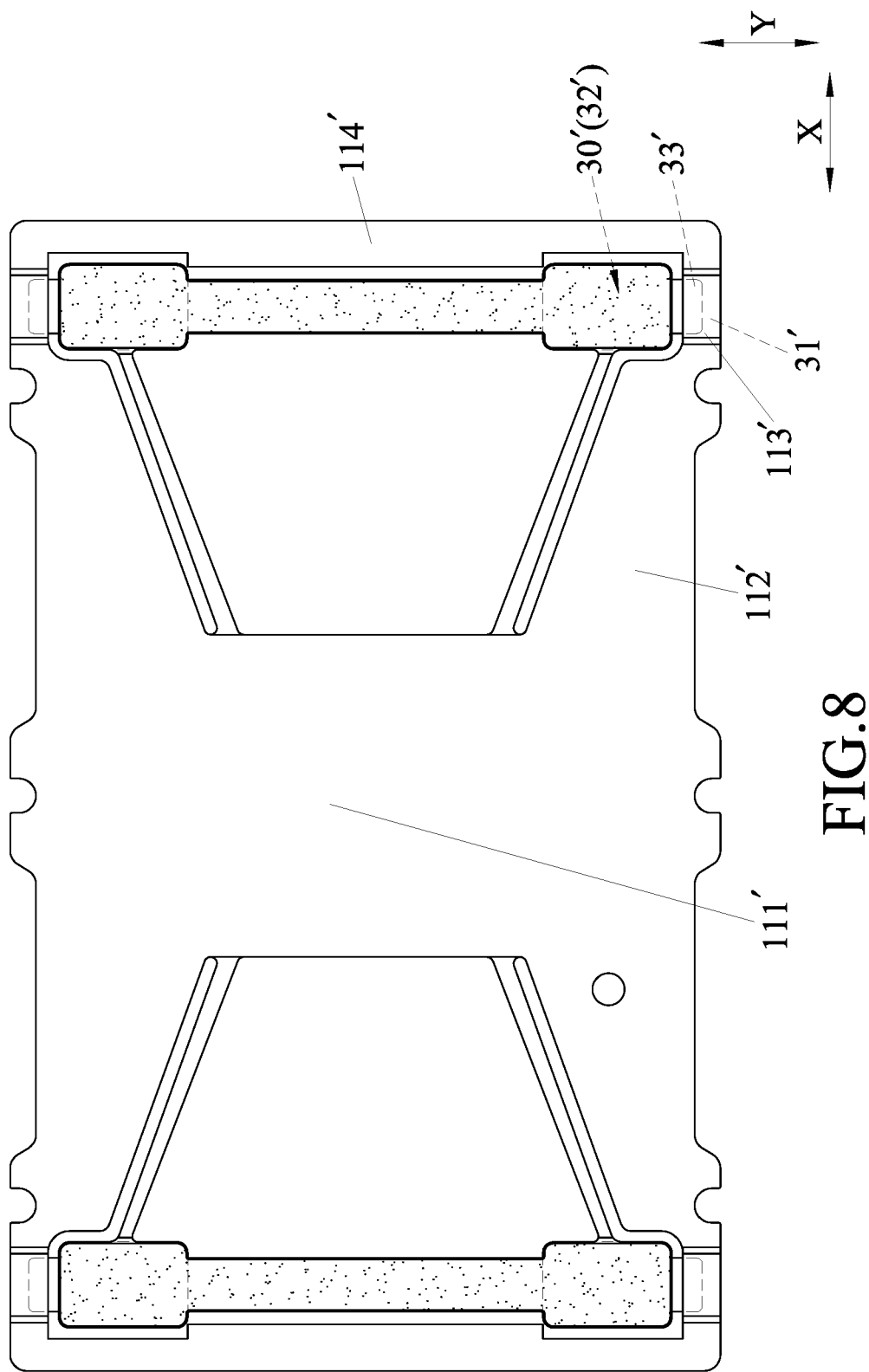
FIG. 8 is a top view of a supporting unit of the second embodiment.
Figure 9:
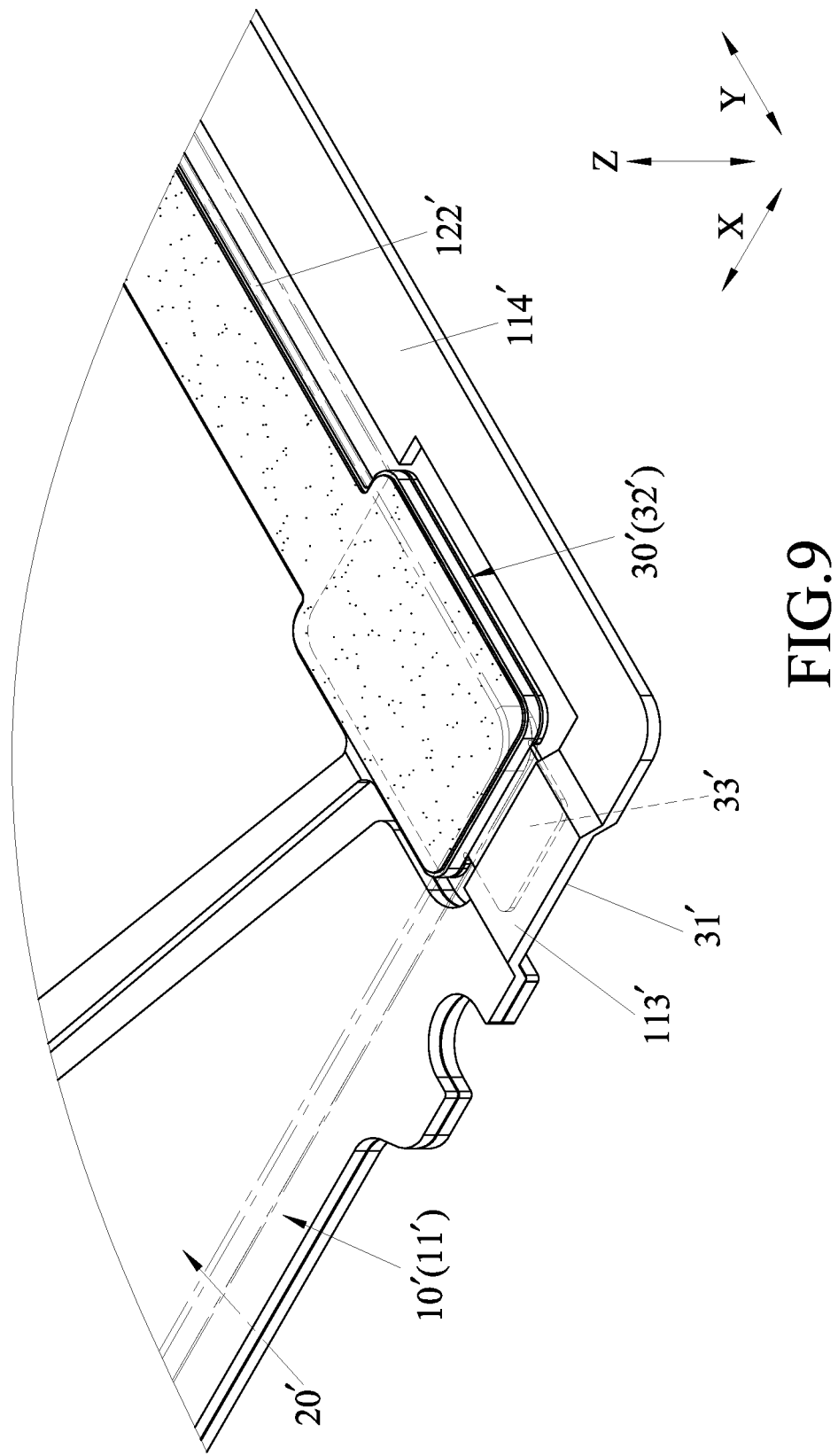
FIG. 9 is an enlarged fragmentary perspective view of the supporting unit and a limiting unit of the second embodiment.
Figure 10:
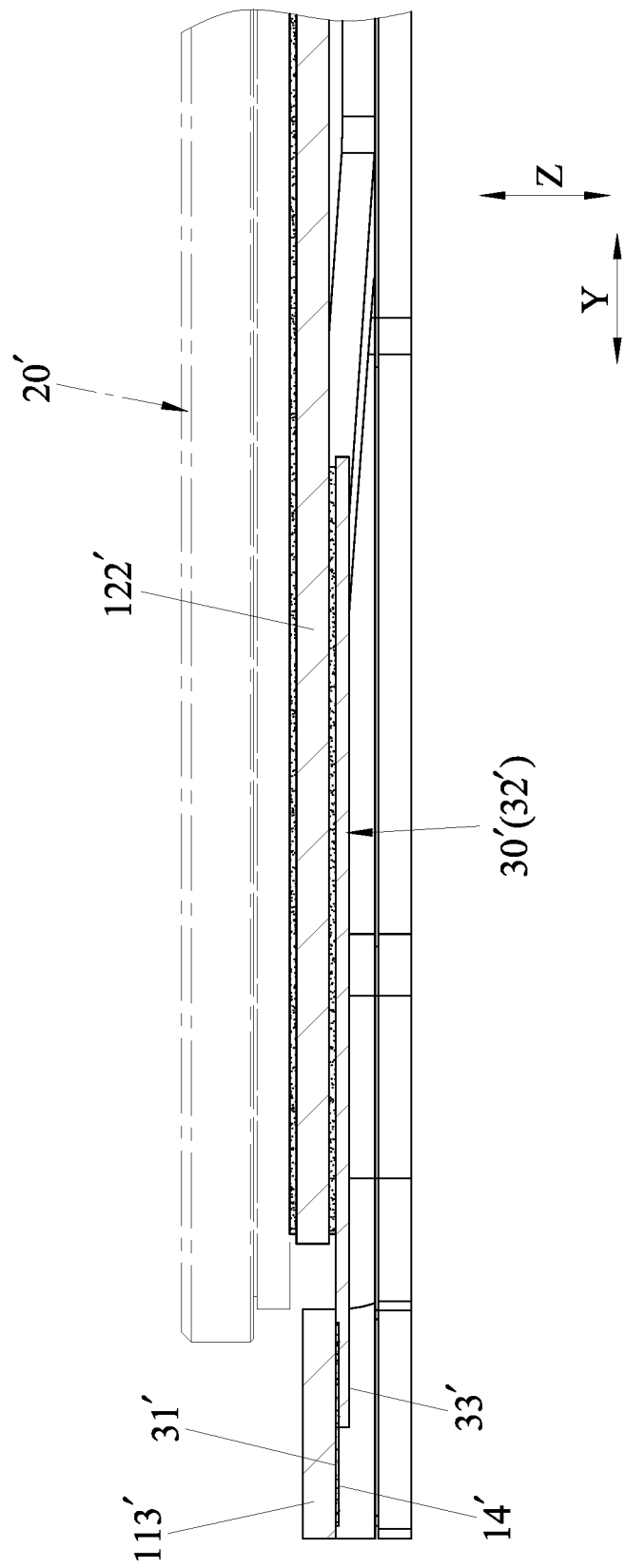
FIG. 10 is a fragmentary sectional view taken along line X-X of FIG. 7.
Figure 11:
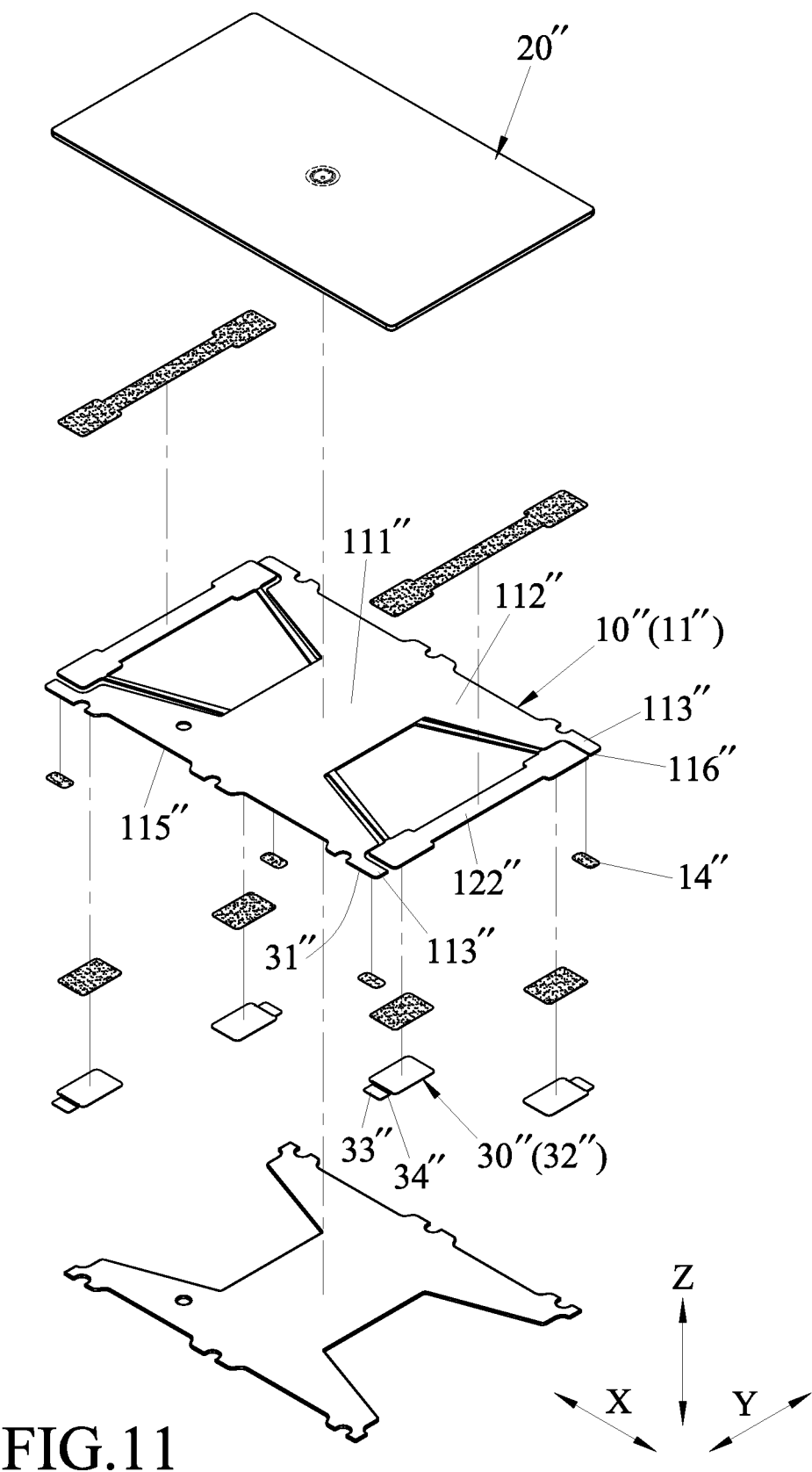
FIG. 11 is an exploded perspective view of a third embodiment of the full-area touch device according to the present disclosure.
Figure 12:
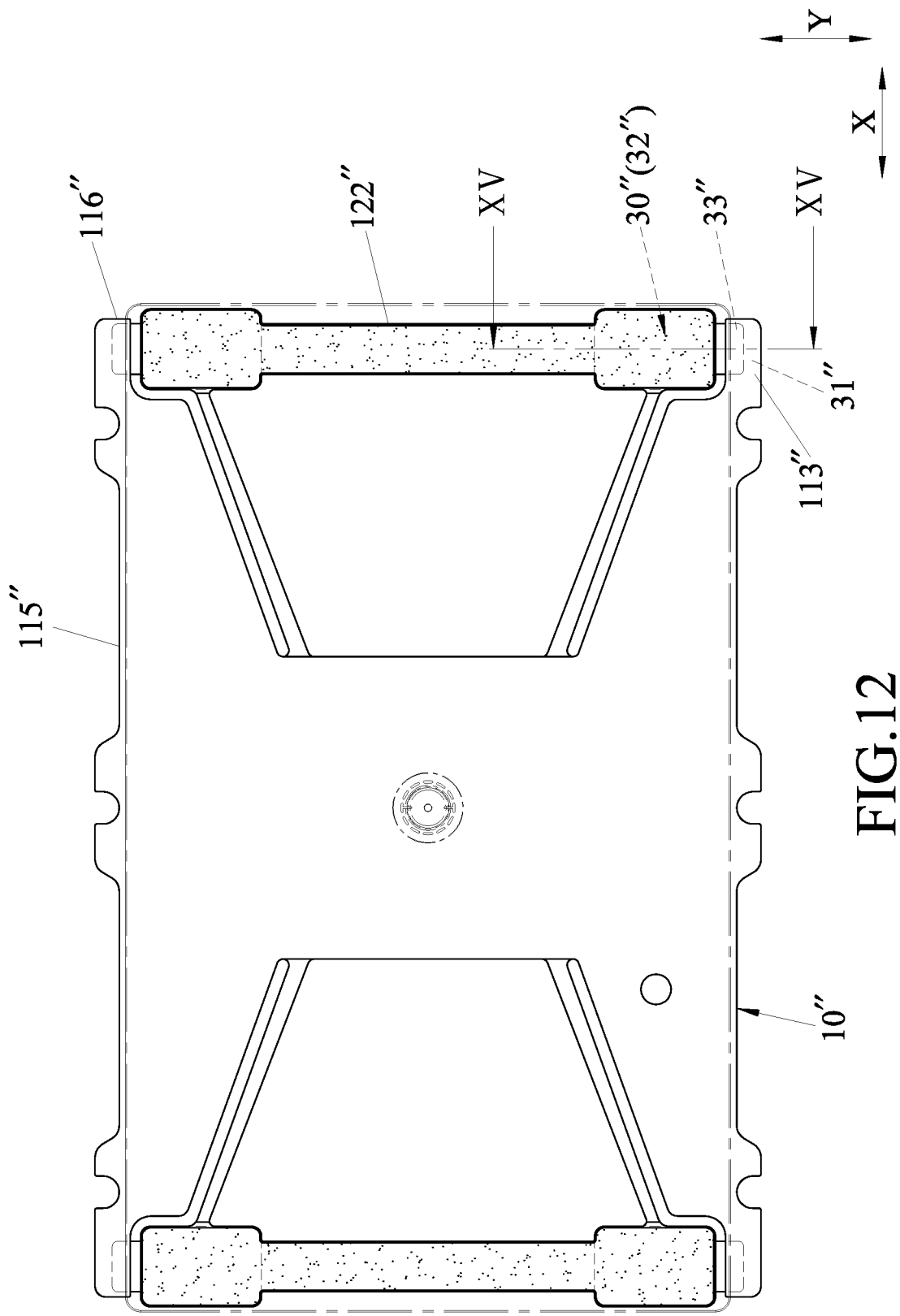
FIG. 12 is a schematic top view of the third embodiment.
Figure 13:
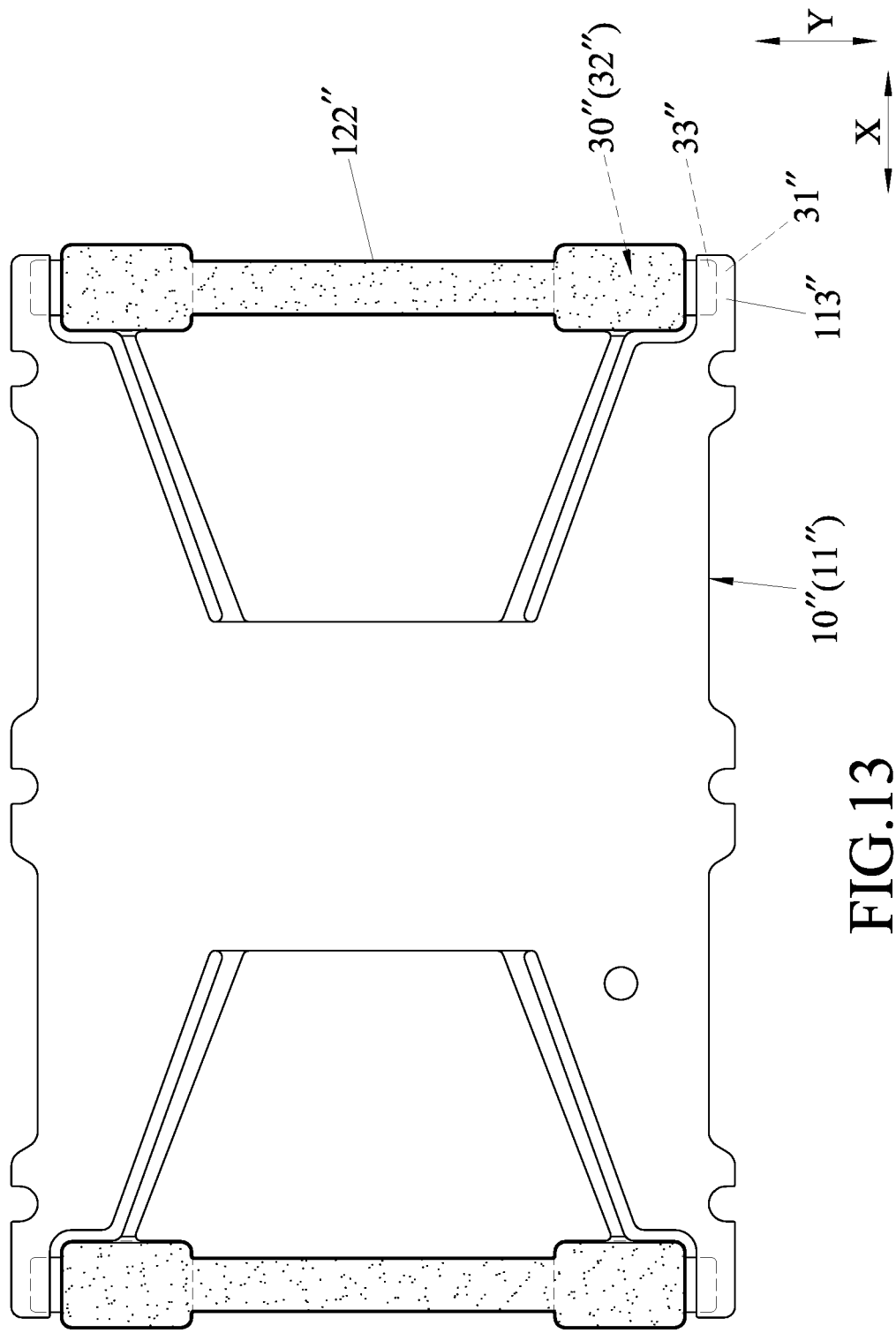
FIG. 13 is a top view of a supporting unit of the third embodiment.
Figure 14:
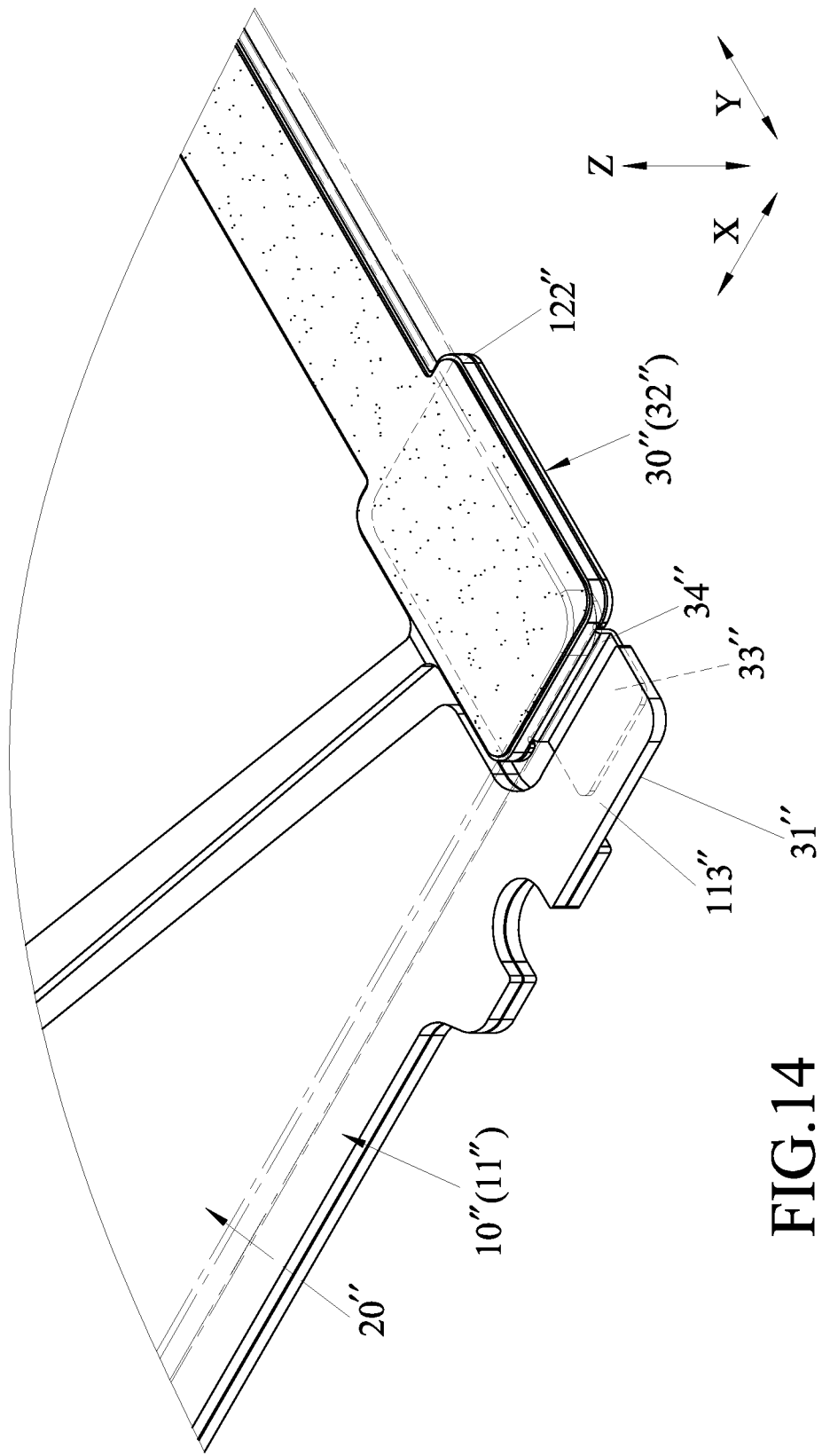
FIG. 14 is an enlarged fragmentary perspective view of the supporting unit and a limiting unit of the third embodiment.
Figure 15:
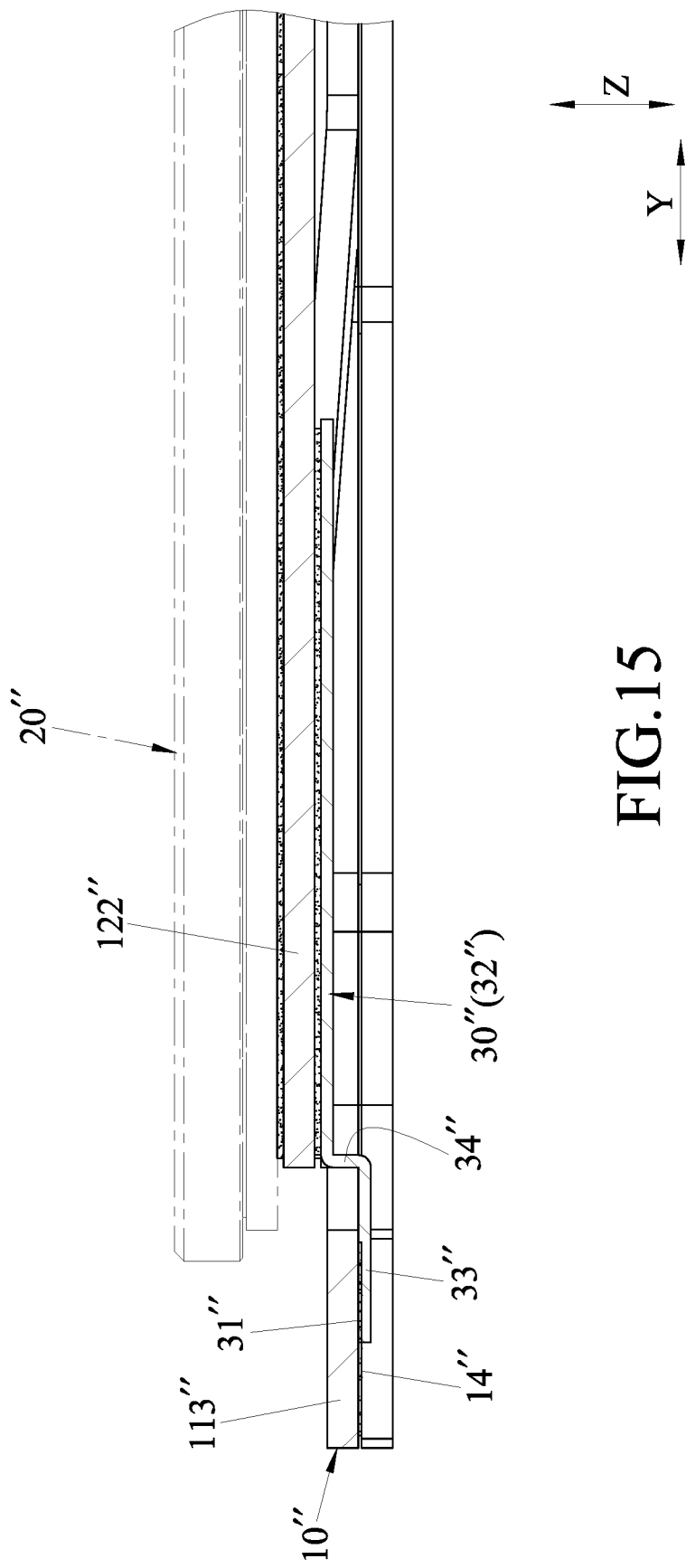
FIG. 15 is a fragmentary sectional view taken along line XV-XV of FIG. 12.
Figure 16:
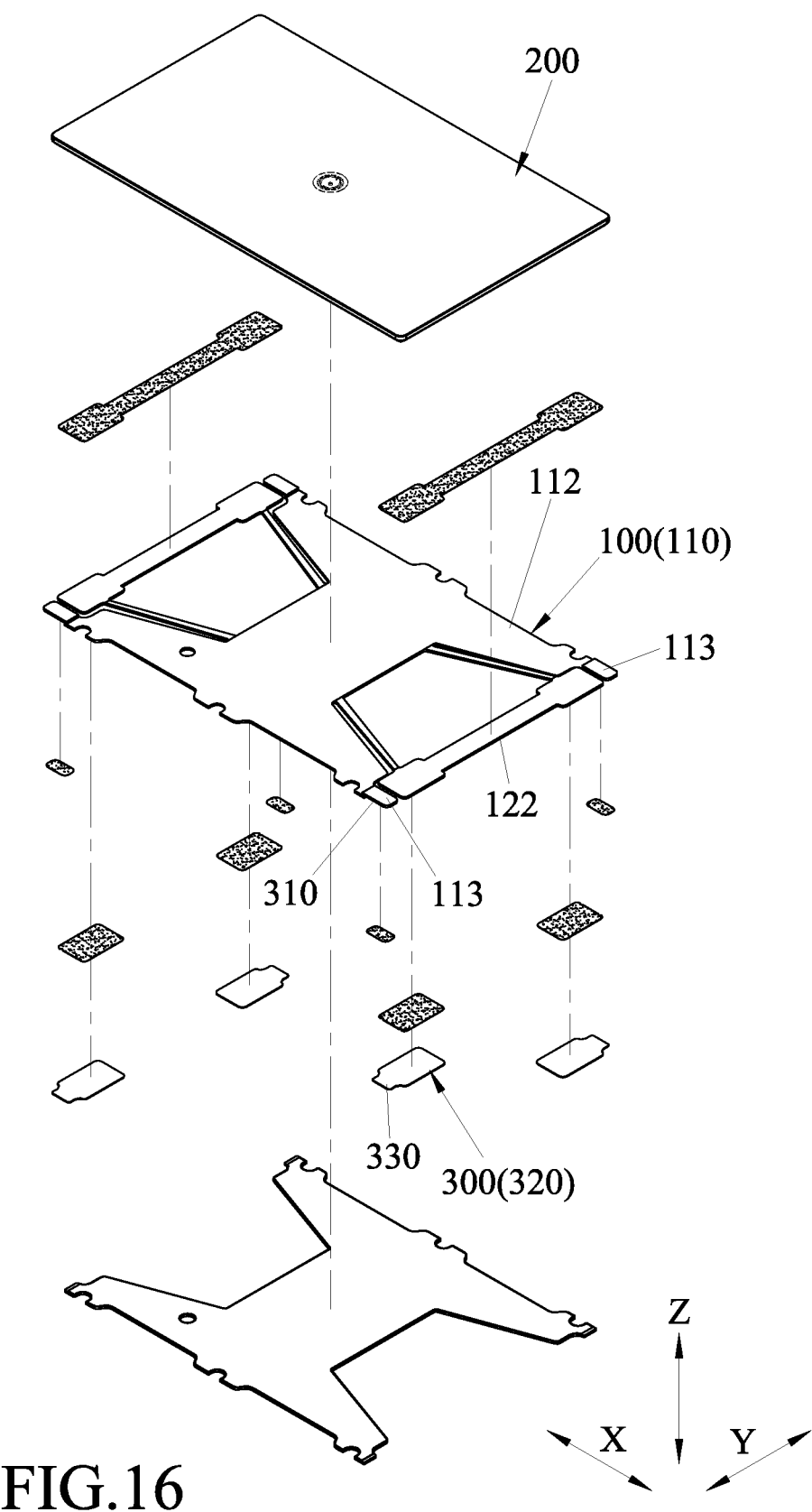
FIG. 16 is an exploded perspective view of a fourth embodiment of the full-area touch device according to the present disclosure.
Figure 17:
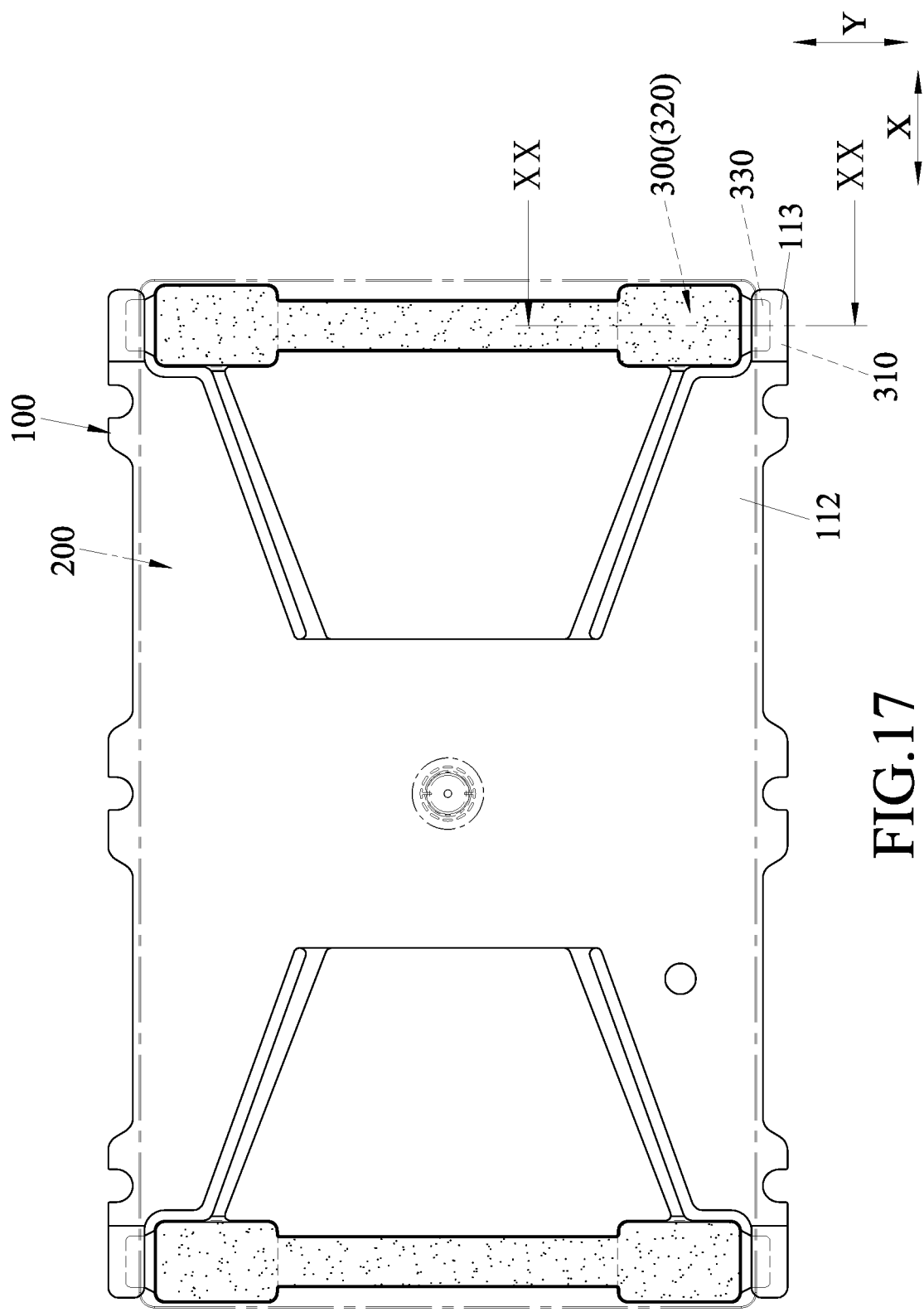
FIG. 17 is a schematic top view of the fourth embodiment.
Figure 18:
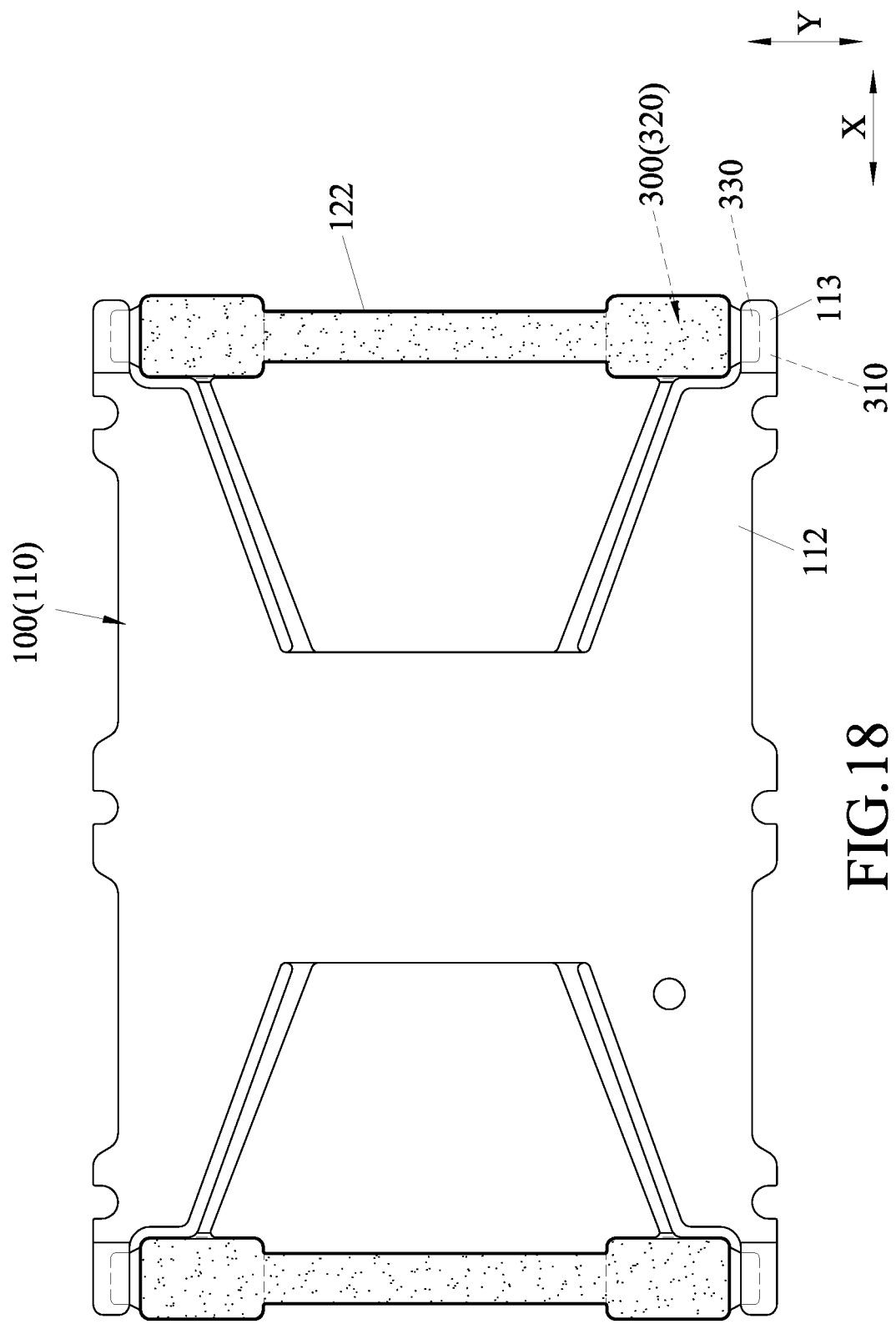
FIG. 18 is a top view of a supporting unit of the fourth embodiment.
Figure 19:
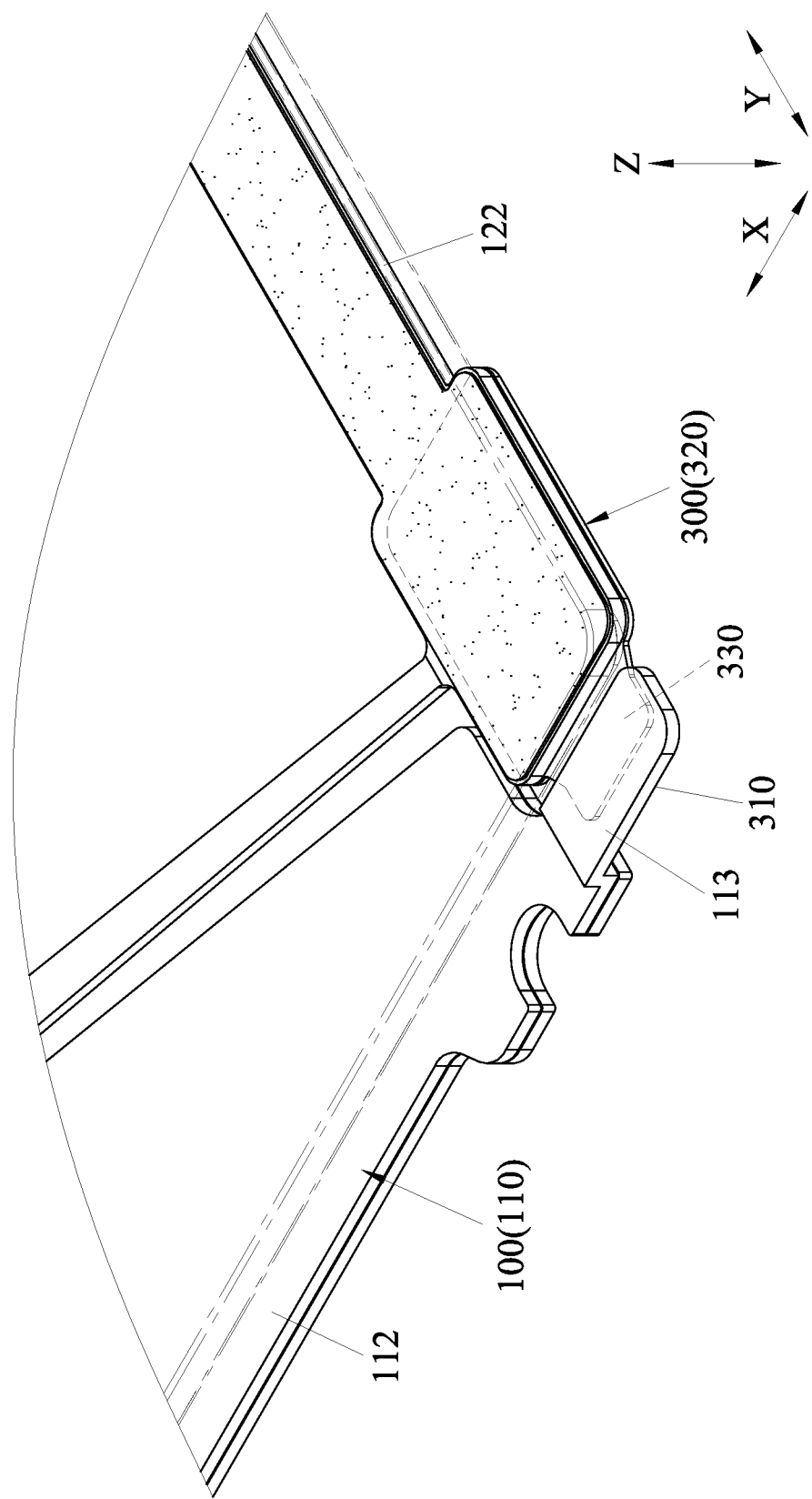
FIG. 19 is an enlarged fragmentary perspective view of the supporting unit and a limiting unit of the fourth embodiment.
Figure 20:
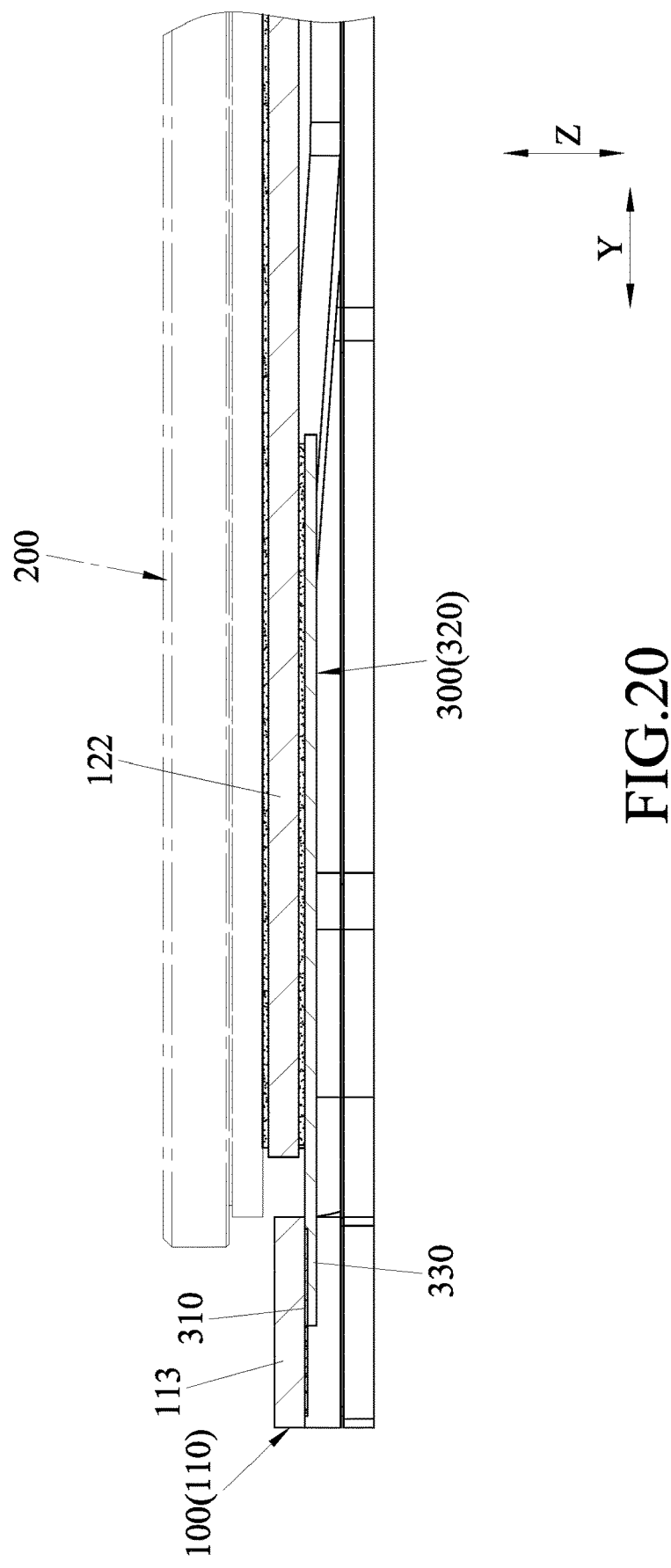
FIG. 20 is a fragmentary sectional view taken along line XX-XX of FIG. 17.

As shown in FIGS. 2, 4 and 5, when the full-area touch device of the present disclosure is fully assembled, the touch control unit 20 is at the unpressed original position relative to the supporting unit 10. At this time, the limiting portions 33 of the limiting units 30 are biased by the resilient forces provided by the support resilient sheet sets 12 to abut against the blocking portions 31 to limit the touch control unit 20 relative to the supporting unit 10, and the tact switch 21 is not triggered.

When a pressing force is applied to press the touch control unit 20 toward the base plate 11, the touch control unit 20 can drive movement of the positioning portions 32 and the limiting portions 33 via the support resilient sheet sets 12. When the touch control unit 20 is moved to the pressed position (not shown), the support resilient sheet sets 12 are bent downwardly toward the hollow portions 117, the limiting portions 33 are away from the blocking portions 31, and the resilient strips 121 are flexibly deformed. At the same time, the tact switch 21 may be turned from an untriggered state to a triggered state relative to the intermediate portion 111 of the supporting unit 10, so that the tact switch 21 generates a signal.

When the pressing force applied to the touch control unit 20 is released, the restoring force provided by the resilient strips 121 moves the touch control unit 20 to be restored to the original position shown in FIG. 5.

Therefore, the present disclosure utilizes the support resilient sheet sets 12 to generate the restoring force and to support the touch control unit 20. By virtue of the support resilient sheet set 12 supporting stably at four corners of the touch control unit 20, the touch control unit 20 can keep balanced. By pressing any area of the touch control unit 20, a click can be achieved. The full-area touch device is convenient to operate, and significantly improves the tactile feel and user experience.

By virtue of the overall structural cooperation, the light and thin design of the full-area touch device can be achieved. The overall height of the full-area touch device can be effectively controlled within 3.0 to 3.5 millimeters to meet the consumers' needs for thin and light systems.

The full-area structure of the present disclosure can be realized in an all-in-one modular manner. That is, without the use of a notebook computer's top and bottom lids and a touch device locking structure, an all-in-one module can be provided, thereby preventing abnormalities in the fitment between the touch device and the top and bottom lids of the notebook computer due to mismatching of mold point numbers on the top and bottom lids, differences in the design of different models' top and bottom lids and the assembly structure of the touch device, and differences in materials of top and bottom lids of the notebook computer, which cause poor sharing capabilities of the touch device, and affect the notebook computer production quality due to touch device matching problems.

The full-area touch device of the present disclosure is structurally simple, and has relatively few components. Compared to conventional half-area touch devices, the cost of assembly and cost of materials of the full-area touch device of the present disclosure are significantly advantageous.

Referring to FIGS. 6 to 10, a second embodiment of the full-area touch device according to the present disclosure is similar to the first embodiment, and includes a supporting unit 10', a touch control unit 20' and a plurality of limiting units 30'. The base plate 11' is H-shaped, and includes an intermediate portion 111', two side frame portions 112', four extension rods 113', two cross rods 114', two first side edges 115', and two second side edges 116'. The second embodiment is different from the first embodiment in that: the extension rods 113' are bent as an arch bridge; and the supporting unit 10' further includes a plurality of flexible pads 14' respectively fixed to bottom portions of the extension rods 113'.

For each limiting unit 30', the blocking portion 31' of is disposed on the bottom portion of a respective one of the extension rods 113', the positioning portion 32' is fixed to a bottom end of one of the floating plates 122', and the limiting portion 33' protrudes outwardly from the positioning portion 32' in the second axial direction (Y), and is limited by the blocking portion 31'. By using the pad 14' adhered to the bottom portions of the extension rods 113' for absorbing manufacturing tolerances, it is ensured that in the original position, the blocking portion 31' of each limiting unit 30' is steadily limited by the positioning portion 32'.

Thus, the object and effect the same as the first embodiment can also be achieved by the second embodiment of the present disclosure.

Referring to FIGS. 11 to 15, a third embodiment of the full-area touch device of this disclosure includes a supporting unit 10", a touch control unit 20", and a plurality of limiting units 30". The base plate 11" is H-shaped, and includes an intermediate portion 111", two side frame portions 112", four extension rods 113", two first side edges 115", and two second side edges 116". Each of the side frame portions 112" is connected to the corresponding extension rods 113" to form a flat plate shape. The third embodiment is different from the first embodiment reside in that: the cross rods 114 are omitted; and the supporting unit 10" further includes a plurality of flexible pads 14" which are respectively fixed to bottom portions of the extension rods 113".

Each limiting unit 30" includes a blocking portion 31" disposed on the bottom portion of the corresponding extension rod 113", a plate-shaped positioning portion 32" connected to a bottom end of one of the floating plates 122", a limiting portion 33", and a turning portion 34" connected between the positioning portion 32" and the blocking portion 31". The limiting portion 33", the positioning portion 32" and the turning portion 34" are formed integrally as one piece. The limiting portion 33" and the positioning portion 32" cooperatively form a stepped shape and are connected transversely and respectively to two sides of the turning portion 34" (see FIG. 15). For each limiting unit 30", the limiting portion 33" projects outwardly from the positioning portion 32" in the second axial direction (Y), and is limited by the blocking portion 31".

Therefore, the object and effects the same as the above-mentioned embodiments can also be achieved by the third embodiment of the present disclosure.

As shown in FIG. 16 to FIG. 20, a fourth embodiment of the full-area touch device according to the present disclosure includes a supporting unit 100, a touch control unit 200 and a plurality of limiting units 300. The differences between the third and forth embodiments reside in: each of the side frame portions 112 of the base plate 110 of the supporting unit 100 cooperates with the corresponding extension rods 113 to form stepped structures, in which the extension rods 113 are offset upwardly relative to the side frame portion 112. Each limiting unit 300 includes a blocking portion 310 disposed on a bottom portion of a respective one of the extension rods 113, a plate-shaped positioning portion 320 connected to a bottom end of one of the floating plates 122, and a limiting portion 330. For each limiting unit 300, the limiting portion 330 and the positioning portion 320 are integrally formed as one piece, the limiting portion 330 and the positioning portion 320 are connected to each other to form a flat plate shape, and the limiting portion 330 protrudes outwardly from the positioning portion 320 in the second axial direction (Y) to be limited by the blocking portion 310.

Therefore, the object and effects the same as the above-mentioned embodiments can also be achieved by the fourth embodiment of the present disclosure.

In summary, the full-area touch device of the present disclosure is simple in structure and easy to operate, and the purpose of the present disclosure can be certainly achieved.

In the present description, the terms "attached", "connected", "fixed", etc. should be understood in a broad sense, and may be fixed connection, detachable connection, or be integral; may be mechanical connections or electrical connections; may be directly connected, or may also be indirectly connected through a middle medium, may be the internal connection between two elements or interaction relationship of the two elements. A person skilled in the art may appreciate the specific meaning of the foregoing terms in this disclosure. Furthermore, the specific features, structures, etc. described in the embodiments are included in at least one embodiment, such as those skilled in the art may combine features of different implementations without conflicting with each other. The scope of protection of the present disclosure is not limited to the above-described specific example approaches, following the basic technical idea according to the present disclosure, those ordinarily skilled in the art need not engage in creative labor and can reason out an implementation, all the aforementioned belong to the scope of protection of the present disclosure.

However, the above is merely an embodiment of the present disclosure, and certainly the scope of practicing the present disclosure is not limited thereto. Any equivalent variation and modification made according to the claims of the present disclosure and the specification of the present disclosure should still be within the scope covered by the present disclosure.

What is claimed is:

1. A full-area touch device comprising:
a supporting unit including a base plate, and a plurality of support resilient sheet sets connected to the base plate, the base plate having two first side edges that extend in a first axial direction, and two second side edges that extend in a second axial direction perpendicular to the first axial direction;
a touch control unit disposed on the support resilient sheet sets, and drivable to move the support resilient sheet sets relative to the base plate in a third axial direction perpendicular to the first axial direction and the second axial direction, the touch control unit being movable relative to the supporting unit between an unpressed original position and a pressed position; and
a plurality of limiting units disposed between the base plate and the support resilient sheet sets for limiting height position and travel distance of the touch control unit, each of the limiting units including a blocking portion that is disposed on the base plate, and a limiting portion that is disposed on a corresponding one of the support resilient sheet sets, the limiting portions of the limiting units extending in one of the first and second axial directions to be limited by the blocking portions of the limiting units.

2. The full-area touch device as claimed in claim 1, wherein the base plate of the supporting unit is H-shaped, and includes an intermediate portion, and two side frame portions spaced apart from each other in the second axial direction and respectively connected to two opposite sides of the intermediate portion, the intermediate portion and the side frame portions cooperatively defining two hollow portions spaced apart from each other in the first axial direction, the number of the support resilient sheet sets being two, the support resilient sheet sets being respectively disposed in the hollow portions and being able to be bent in the third axial direction.

3. The full-area touch device as claimed in claim 2, wherein the base plate of the supporting unit further includes four extension rods respectively connected to opposite ends of the side frame portions and extending in the first axial direction, and two cross rods extending in the second axial direction and each connected between two of the extension rods, the intermediate portion cooperating with the side frame portions, the extension rods and the cross rods to define the hollow portions, the second side edges being respectively defined the cross rods, the blocking portion of each the limiting units being disposed on a bottom portion of a corresponding one of the cross rods, each of the limiting units further including a plate-shaped positioning portion adhered to a bottom portion of a corresponding support resilient sheet set, each limiting portion being integrally connected to the corresponding positioning portion, and extending outwardly from the corresponding support resilient sheet set in the first axial direction to be limited by the corresponding blocking portion.

4. The full-area touch device as claimed in claim 2, wherein the base plate of the supporting unit further includes four extension rods extending in the first axial direction and respectively connected to opposite ends of the side frame portions, and two cross rods extending in the second axial direction and each being connected between two of the extension rods, the intermediate portion cooperating with the side frame portions, the extension rods and the cross rods to define the hollow portions, the second side edges being respectively defined by the cross rods, the blocking portion of each of the limiting units being disposed on a bottom portion of a respective one of the extension rods, each of the limiting units further including a plate-shaped positioning portion adhered to a bottom portion of a corresponding support resilient sheet set, each limiting portion projecting outwardly from the corresponding positioning portion in the second axial direction to be limited by the corresponding blocking portion.

5. The full-area touch device as claimed in claim 2, wherein the base plate of the supporting unit further includes four extension rods extending in the first axial direction and respectively connected to opposite ends of the side frame portions, the intermediate portion cooperating with the side frame portions and the extension rods to define the hollow portions, the blocking portion of each limiting unit being disposed on a bottom portion of a respective one of the extension rods, each of the limiting units further including a plate-shaped positioning portion adhered to a bottom portion of the corresponding support resilient sheet set, each limiting portion projecting outwardly from the corresponding positioning portion in the second axial direction to be limited by the corresponding blocking portion.

6. The full-area touch device as claimed in claim 5, wherein each of the side frame portions of the base plate of the supporting unit is connected to the corresponding extension rods to form a flat plate shape, each of the limiting units further includes a turning portion connected between the positioning portion and the limiting portion, the limiting portion and the positioning portion and the turning portion being integrally formed as one piece, the limiting portion and the positioning portion cooperatively forming a stepped shape and being connected transversely and respectively to two sides of the turning portion.

7. The full-area touch device as claimed in claim 5, wherein each of the side frame portions of the base plate of the supporting unit cooperates with the corresponding extension rods to form stepped structures in which the extension rods are offset upwardly relative to the side frame portion, for each limiting unit, the limiting portion and the positioning portion being integrally formed as one piece, and being connected to each other to form a flat plate shape.

8. The full-area touch device as claimed in claim 4, wherein the supporting unit further includes a plurality of flexible pads respectively fixed to bottom portions of the extension rods.

9. The full-area touch device as claimed in claim 5, wherein the supporting unit further includes a plurality of flexible pads respectively fixed to bottom portions of the extension rods.

* * * * *